(12) United States Patent
Sharma et al.

(10) Patent No.: US 8,918,848 B2
(45) Date of Patent: Dec. 23, 2014

(54) METHOD AND SYSTEM FOR THIRD PARTY CLIENT AUTHENTICATION

(75) Inventors: Girish Kumar Sharma, Waterloo (CA); Lenny Kwok-Ming Hon, Richmond Hill (CA); Joseph Daniel Burjoski, Kitchener (CA); Kenneth Cyril Schneider, Blue Mountains (CA)

(73) Assignee: BlackBerry Limited, Waterloo, Ontario (CA)

( * ) Notice: Subject to any disclaimer, the term of this patent is extended or adjusted under 35 U.S.C. 154(b) by 485 days.

(21) Appl. No.: 12/767,067

(22) Filed: Apr. 26, 2010

(65) Prior Publication Data

US 2011/0265172 A1 Oct. 27, 2011

(51) Int. Cl.
*H04L 29/06* (2006.01)

(52) U.S. Cl.
CPC ........ *H04L 63/0815* (2013.01); *H04L 63/0884* (2013.01)
USPC ................ 726/6; 726/5; 726/7; 726/8; 726/9; 726/10; 726/12; 726/18; 726/19; 726/20; 713/156; 713/157; 713/158; 713/168; 713/186; 713/172; 713/173; 713/174

(58) Field of Classification Search
CPC ...... H04L 63/08; H04L 63/0815; G06F 21/41
USPC .............. 726/5–10, 27, 12, 18; 713/155–159, 713/168–186; 380/247–250; 705/18, 44; 709/225; 707/705
See application file for complete search history.

(56) References Cited

U.S. PATENT DOCUMENTS

| | | | |
|---|---|---|---|
| 5,586,260 A * | 12/1996 | Hu ................................ | 726/12 |
| 5,991,810 A * | 11/1999 | Shapiro et al. ................ | 709/229 |
| 7,409,710 B1 * | 8/2008 | Uchil et al. .................... | 726/19 |
| 7,487,539 B2 * | 2/2009 | Ramachandran et al. ...... | 726/10 |
| 7,810,143 B2 * | 10/2010 | Ruzyski et al. ................. | 726/5 |
| 7,827,405 B2 * | 11/2010 | Christiansen et al. ........ | 713/169 |
| 7,853,995 B2 * | 12/2010 | Chow et al. .................... | 726/10 |
| 2006/0021004 A1 * | 1/2006 | Moran et al. .................... | 726/2 |
| 2006/0233160 A1 * | 10/2006 | Kawanishi et al. ........... | 370/352 |
| 2007/0101418 A1 * | 5/2007 | Wood et al. .................... | 726/8 |

(Continued)

FOREIGN PATENT DOCUMENTS

WO 2009069889 6/2009

OTHER PUBLICATIONS

Cheng Xiao-rong et al., Research and Realization of Authentication Technique Based on OTP and Kerberos, Jul. 2005, IEEE, pp. 1-5.*

(Continued)

*Primary Examiner* — Luu Pham
*Assistant Examiner* — Fahimeh Mohammadi
(74) *Attorney, Agent, or Firm* — Bereskin & Parr LLP/S.E.N.C.R.L., s.r.l.

(57) ABSTRACT

Methods and systems for third party client authentication of a client. A method includes displaying a user interface on a display of the client, the user interface including an option to select a supported credential type of a third party authentication server, receiving a command selecting the supported credential type, and sending credential information and the selected supported credential type to an authentication server for third party authentication by the third party authentication server. The third party authentication server may support a token-based authentication protocol for implementing single sign on (SSO).

15 Claims, 8 Drawing Sheets

(56) References Cited

U.S. PATENT DOCUMENTS

| | | | | |
|---|---|---|---|---|
| 2007/0180508 | A1* | 8/2007 | Thomson | 726/8 |
| 2008/0092215 | A1* | 4/2008 | Soukup et al. | 726/5 |
| 2009/0183225 | A1* | 7/2009 | Malakapalli et al. | 726/1 |
| 2009/0287922 | A1* | 11/2009 | Herwono et al. | 713/155 |
| 2010/0083002 | A1* | 4/2010 | Cui et al. | 713/189 |
| 2010/0175134 | A1* | 7/2010 | Ali-Ahmad et al. | 726/24 |
| 2010/0251345 | A1* | 9/2010 | James et al. | 726/5 |
| 2011/0016320 | A1* | 1/2011 | Bergsten et al. | 713/170 |
| 2011/0041171 | A1* | 2/2011 | Burch et al. | 726/7 |
| 2011/0213966 | A1* | 9/2011 | Fu et al. | 713/158 |

OTHER PUBLICATIONS

Fu Cheng You, Application of Mobile Agent and Trusted Third Party on Digital Copyright Protecting in E-Commerce, Dec. 20-22, 2008, IEEE, pp. 800-804.*

Oscar Botero et al., Platform and experimentation of secure service location with P2P/Client-Server over ad hoc networks, Dec. 15-17, 2009, IEEE, pp. 1-5.*

Stefano Salsano et al., SIP Security Issues: The SIP Authentication Procedure and its Processing Load, IEEE, pp. 38-44.*

Pluggable Authentication Modules Mar. 2010 found at http://en.wikipedia.org/wiki/Pluggable_Authentication_Modules.

Pluggable Authentication Provider, 2010, found at http://msdn.microsoft.com/en-us/library/bb802764.aspx.

Extended European Search Report dated Feb. 9, 2011 for corresponding EP Application No. 10161089.7.

Secure Authentication System for Public WLAN Roaming; XP19213675A1; 2005.

Intention to Grant Communication under Rule 71(3) EPC dated Apr. 24, 2013, for corresponding European Patent Application No. 10161089.7.

European Exam Report Response dated Nov. 30, 2012, for corresponding European Patent Application No. 10161089.7.

European Exam Report dated May 31, 2012, for corresponding European Patent Application No. 10161089.7.

European EESR Reply dated Apr. 19, 2011, for corresponding European Patent Application No. 10161089.7.

Decision to Grant Communication. European Patent Application No. 10161089.7. Dated Aug. 1, 2013.

Office Action. Canadian Patent Application No. 2,738,063. Dated Aug. 26, 2013.

Notice of Allowance. Canadian Patent Application No. 2,738,063. Dated Oct. 27, 2014.

* cited by examiner

Client Login context:

METHOD AND SYSTEM FOR THIRD PARTY CLIENT AUTHENTICATION

TECHNICAL FIELD

Example embodiments described herein relate to third party authentication of clients.

BACKGROUND

Authentication servers are used to authenticate clients that wish to access various services or applications. In conventional systems having authentication servers, the client presents a particular set of credentials (such as username and password) to the authentication server. One approach is for the authentication server to validate the presented credentials against system's internal store to authenticate the client's identity. This approach has the drawback that the systems must store user credentials of the client.

Another approach is to delegate authentication to a trusted third party authenticator, which does not require the systems to store user credentials. In some existing systems, for third party authentication the authentication server merely sends the set of credentials to the third party authenticator and receives a confirmation or rejection of authentication. In using such a system, difficulties arise when dealing with many different possible third party authenticators, each supporting numerous credential types. For example, it may be redundant and unnecessarily complex to create a specific system pluggable authentication module for each credential for each third party authenticator.

Other difficulties with existing systems will be appreciated in view of the detailed description hereinbelow.

BRIEF DESCRIPTION OF THE DRAWINGS

Embodiments will now be described by way of example with reference to the accompanying drawings, in which like reference numerals are used to indicate similar features, and in which.

DETAILED DESCRIPTION OF EXAMPLE EMBODIMENTS

Example embodiments described herein relate to third party authentication of clients, which includes a client sending a selected credential type of a third party authenticator to an authentication server.

In an example embodiment, there is provided a method for third party authentication of a client, including displaying a user interface on a display of the client, the user interface including an option to select a supported credential type of a third party authentication server, receiving a command selecting the supported credential type, and sending credential information and the selected supported credential type to an authentication server for third party authentication by the third party authentication server.

In another example embodiment, there is provided a client, the client including one or more controllers for controlling operation of the client, a display for displaying a user interface, the user interface including an option to select a supported credential type of a third party authentication server, an input device for receiving a command selecting the supported credential type, and a communication subsystem for sending credential information and the selected supported credential type to an authentication server for third party authentication by the third party authentication server.

In yet another example embodiment, there is provided a method for third party authentication of a client, the method being performed by an authentication server, including requesting, from a module associated with a third party authentication server, supported credential types of said third party authentication server, receiving said supported credential types; and sending to the client an identification of the supported credential types.

In yet another example, there is provided an authentication server for third party authentication of a client, including a controller configured for requesting, from a module associated with a third party authentication server, supported credential types of said third party authentication server; receiving said supported credential types; and sending to the client an identification of the supported credential types.

In example embodiments, third party authenticators may also be referred to as external authenticators.

Figure 1:
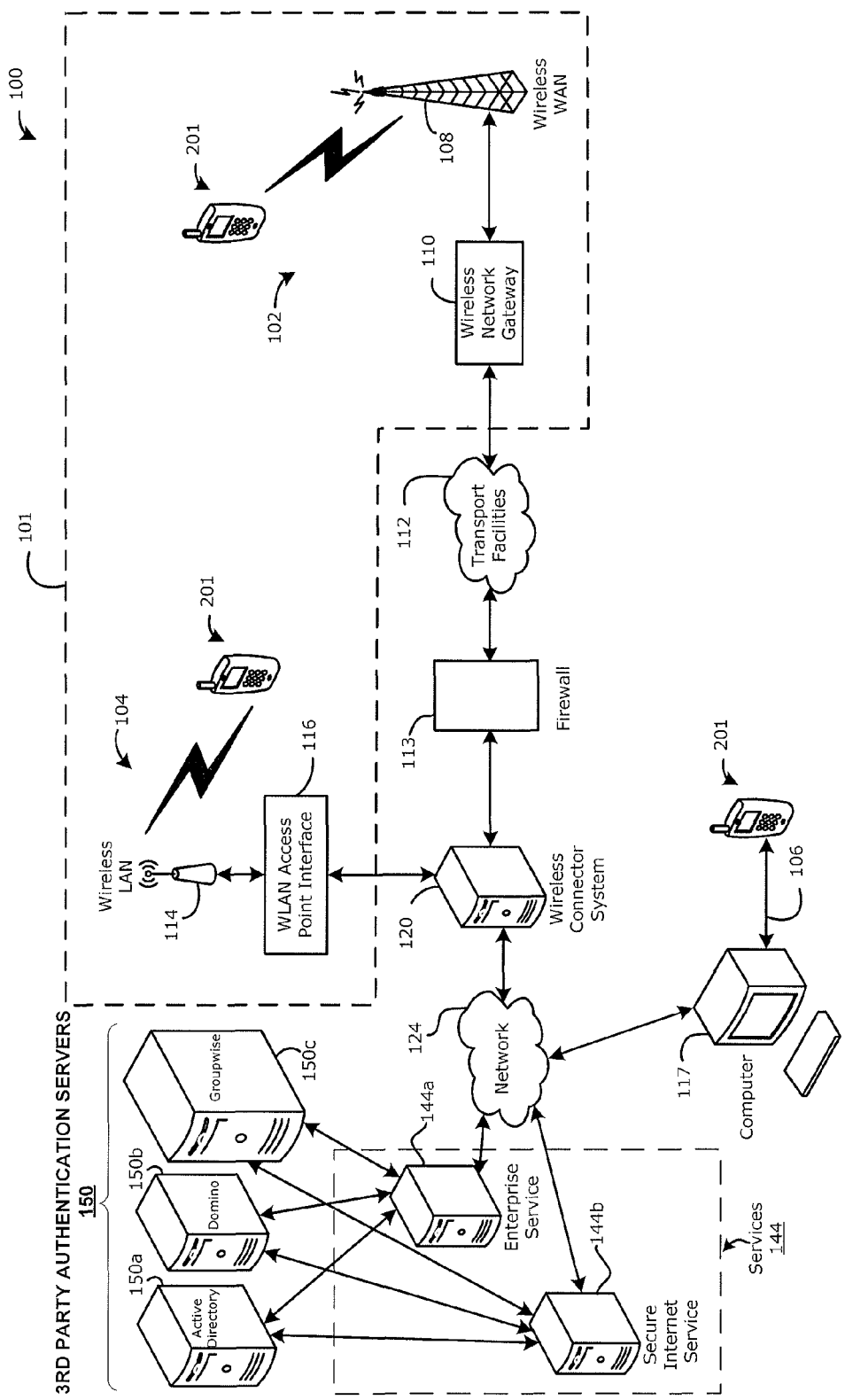
FIG. 1 shows a block diagram illustrating a communication system including authentication servers to which example embodiments can be applied.

Reference is made to FIG. 1 which shows in block diagram form a communication system 100 in which example embodiments according to the present disclosure may be applied. The communication system 100 comprises a number of mobile communication devices ("mobile devices") 201 which may be connected to the remainder of system 100 in any of several different ways. Accordingly, several instances of mobile devices 201 are depicted in FIG. 1 as employing different example ways of connecting to system 100. Mobile devices 201 are connected to a wireless communication network 101 which may comprise one or more of a Wireless Wide Area Network (WWAN) 102, a Wireless Local Area Network (WLAN) 104, or any other suitable network arrangements. In some embodiments, the mobile devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of base stations 108 (one of which is shown in FIG. 1), each containing radio transmitting and receiving equipment adapted to provide wireless radio-frequency (RF) network service or "coverage" to a corresponding area or cell. The WWAN 102 is typically operated by a mobile network service provider that provides subscription packages to users of the mobile devices 201. The WWAN 102 may be implemented as any appropriate wireless network, including but not limited to any to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX). Other network types and technologies could also be used. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

A wireless network gateway 110 may be associated with the WWAN 102 to connect the mobile devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the mobile devices 201 and other devices (not shown) connected, directly or indirectly, to the WWAN 102. Accordingly, communications sent via the mobile devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile devices 201.

The WLAN 104 comprises a wireless network which, in some embodiments, conforms to IEEE 802.11x standards (sometimes referred to as Wi-Fi) such as, for example, any or all of the IEEE 802.11a, 802.11b, 802.11g, or 802.11n standards. Other communication protocols may be used for the WLAN 104 in other embodiments such as, for example, IEEE 802.16e (also referred to as Worldwide Interoperability for Microwave Access or "WIMAX"), or IEEE 802.20 (also referred to as Mobile Wireless Broadband Access). The WLAN 104 includes one or more wireless RF Access Points (AP) 114 (one of which is shown in FIG. 1) that collectively provide WLAN service or "coverage" over an area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including e-mail messages, to and from a set of managed mobile devices 201. The wireless connector system 120 also provides administrative control and management capabilities over users and mobile devices 201 which may connect to the wireless connector system 120.

The wireless connector system 120 typically provides a secure exchange of data (e.g., e-mail messages, personal information manager (PIM) data, and IM data) with the mobile devices 201. In some embodiments, communications between the wireless connector system 120 and the mobile devices 201 are encrypted.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, a conventional serial protocol, or any other appropriate data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1, sometimes referred to as "BLUETOOTH", or IEEE 802.15.3a, also referred to as UltraWideband (UWB), or any other appropriate PAN connection.

It will be appreciated that the above-described communication system is provided for the purpose of illustration only, and that the above-described communication system comprises one possible communication network configuration of a multitude of possible configurations for use with the mobile devices 201. The teachings herein may be employed in connection with any other type of network and associated devices that are effective in implementing or facilitating wireless communication. Suitable variations of the communication system will be understood to a person of skill in the art.

Figure 2:
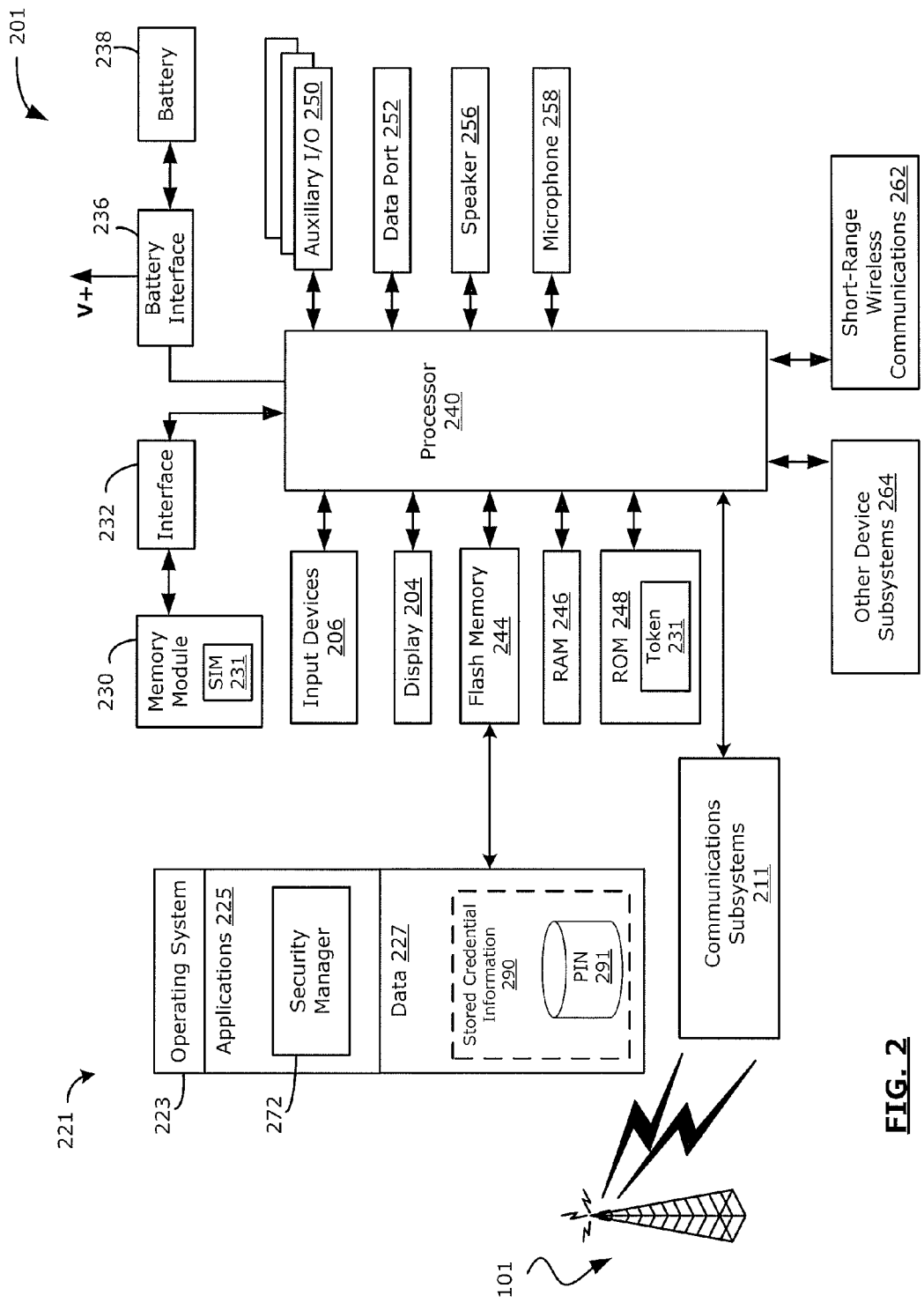
FIG. 2 shows a block diagram illustrating a mobile communication device to be used in the communication system of FIG. 1 in accordance with an example embodiment.

Reference is now made to FIG. 2 which illustrates a mobile device 201 in which example embodiments of a client device can be applied. The mobile device 201 is a two-way communication device having data and voice communication capabilities, and the capability to communicate with other computer systems, for example, via the Internet. Depending on the functionality provided by the mobile device 201, in various embodiments the mobile device 201 may be a handheld device, a multiple-mode communication device configured for both data and voice communication, a smartphone, a mobile telephone or a PDA (personal digital assistant) enabled for wireless communication.

The mobile device 201 includes a rigid case (not shown) housing the components of the mobile device 201. The internal components of the mobile device 201 may, for example, be constructed on a printed circuit board (PCB). The description of the mobile device 201 herein mentions a number of specific components and subsystems. Although these components and subsystems may be realized as discrete elements, the functions of the components and subsystems may also be realized by integrating, combining, or packaging one or more elements in any suitable fashion. The mobile device 201 includes a controller comprising at least one processor 240 (such as a microprocessor) which controls the overall operation of the mobile device 201. The processor 240 interacts with device subsystems such as a wireless communication subsystem 211 for exchanging radio frequency signals with the wireless network 101 to perform communication functions. The processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which may employ any appropriate a wireless (e.g., RF), optical, or other short range communications technology), and other device subsystems generally designated as 264. Some of the subsystems shown in FIG. 2 perform communication-related functions, whereas other subsystems may provide "resident" or on-device functions.

Display 204 may be realized as a touch-screen display in some embodiments. The touch-screen display may be constructed using a touch-sensitive input surface connected to an electronic controller and which overlays the visible element of display 204. The touch-sensitive overlay and the electronic controller provide a touch-sensitive input device and the processor 240 interacts with the touch-sensitive overlay via the electronic controller.

The wireless communication subsystem 211 includes one or more communication systems for communicating with wireless WAN base stations 108 and wireless LAN access points 114 within the wireless network 101. The particular design of the wireless communication subsystem 211 depends on the wireless network 101 in which mobile device 201 is intended to operate. The mobile device 201 may send and receive communication signals over the wireless network 101 after the required network registration or activation procedures have been completed.

The processor 240 operates under stored program control and executes software modules 221 stored in memory such as persistent memory 244 or ROM 248. ROM 248 may contain data, program instructions or both. Persistent memory 244 may contain data, program instructions or both, in some embodiments is rewritable under control of processor 240, and may be realized using any appropriate persistent memory technology, including EEPROM, EAROM, FLASH, and the like. As illustrated in FIG. 2, the software modules 221 comprise operating system software 223 and software applications 225.

Software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may further include a range of applications, including, for example, an e-mail messaging application, address book, calendar application, notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display 204) according to the application.

In some embodiments, the auxiliary input/output (I/O) subsystems 250 may comprise an external communication link or interface, for example, an Ethernet connection. The auxiliary I/O subsystems 250 may further comprise one or more input devices, including a pointing or navigational tool such as a clickable trackball or scroll wheel or thumbwheel, or one or more output devices, including a mechanical transducer such as a vibrator for providing vibratory notifications in response to various events on the mobile device 201 (e.g., receipt of an electronic message or incoming phone call), or for other purposes such as haptic feedback (touch feedback).

The mobile device 201 also includes a battery 238 which furnishes energy for operating the mobile device 201. The battery may be coupled to the electrical circuitry of mobile device 201 through a battery interface 236, which may manage such functions as charging the battery from an external power source (not shown) and the distribution of energy to various loads within or connected to the mobile device 201. Short-range communication subsystem 262 is an additional optional component which provides for communication between the mobile device 201 and different systems or devices, which need not necessarily be similar devices. For example, the short-range communication subsystem 262 may include an infrared device and associated circuits and components, or a wireless bus protocol compliant communication mechanism such as a BLUETOOTH communication module to provide for communication with similarly-enabled systems and devices.

In some embodiments, the mobile device 201 also includes one or more removable memory modules 230 (typically comprising FLASH memory) and one or more memory module interfaces 232. Among possible functions of the removable memory module 230 is to store information used to identify or authenticate a user or the user's account to wireless network 101. For example, in conjunction with certain types of wireless networks, including GSM and successor networks, the removable memory module 230 includes a Subscriber Identity Module or SIM 231. The memory module 230 is inserted in or connected to the memory module interface 232 of the mobile device 201 in order to operate in conjunction with the wireless network 101. In example embodiments, the SIM 231 acts as a smart card containing stored credential information for authentication of the mobile device 201.

The mobile device 201 stores data 227 in a persistent memory 244. In various embodiments, the data 227 includes stored credential information 290 such as personal identification number (PIN) 291, as is understood in the art, to be sent from the mobile device 201 for third party authentication. Further, in example embodiments, the RAM 246 may temporarily store a token 249 to be used as credential information, described in greater detail herein. The token 249 may be a SPNEGO (Simple and Protected GSSAPI Negotiation Mechanism) token, as is understood in the art.

A predetermined set of applications that control basic device operations, including data and possibly voice communication applications will normally be installed on the mobile device 201 during or after manufacture. Additional applications and/or upgrades to the operating system software 223 or software applications 225 may also be loaded onto the mobile device 201 through the wireless network 101, the auxiliary I/O subsystem 250, the data port 252, the short-range communication subsystem 262, or other suitable subsystem such as 264. The downloaded programs or code modules may be permanently installed, for example, written into the program memory (e.g. the persistent memory 244), or written into and executed from the RAM 246 for execution by the processor 240 at runtime.

The mobile device 201 may provide two principal modes of communication: a data communication mode and an optional voice communication mode. In the data communication mode, a received data signal such as a text message, an e-mail message, Web page download, or an image file will be processed by the wireless communication subsystem 211 and input to the processor 240 for further processing. For example, a downloaded Web page may be further processed by a browser application or an e-mail message may be processed by an e-mail message messaging application and output to the display 204. A user of the mobile device 201 may also compose data items, such as e-mail messages, for example, using the input devices in conjunction with the display 204. These composed items may be transmitted through the wireless communication subsystem 211 over the wireless network 101. In the voice communication mode, the mobile device 201 provides telephony functions and operates as a typical cellular phone.

Referring again to FIG. 1, the wireless connector system 120 allows the mobile devices 201 to access the network 124 and connected resources and one or more remote services (each or collectively 144). The services 144 may include one or more enterprise services (e.g., one shown as enterprise service 144a) and one or more Internet services (e.g., shown as secure Internet service 144b). Additional services may include unsecure Internet services, which are not described herein as they typically are not involved in authentication. Generally, the services 144 may include one or more authentication servers 306 (may also be referred to as authentication services) or modules which facilitate authentication of the mobile device 201 by communicating with third party authentication servers (each or collectively 150). Once a mobile device 201 is authenticated, the service 144 provides access to various associated applications and services.

The services 144 may also communicate with other the application servers (not shown) for the provision of these applications and services. Briefly, the enterprise service 144a may, for example, include an e-mail messaging server implementing Microsoft EXCHANGE, IBM LOTUS DOMINO, or Novell GROUPWISE. Some such servers are also referred to as "groupware" servers. The secure Internet service 144b may be configured for implementing applications such as instant messaging (IM) applications, e-mail (such as web-based e-mail), voice mails, appointments, task items, and calendar events. The secure Internet service 144b may also include a content server for providing content such as internet content or content from an organization's internal servers to the mobile devices 201 in the wireless network 101. Although services 144 are depicted in FIG. 1 as implemented via discrete servers, the services 144 may be distributed or integrated over any appropriate number and topology of servers.

Referring still to FIG. 1, the third party authentication servers 150 may be provided by third-party providers which are independently operated and typically hosted remotely from the services 144. By way of example only, third party authentication server 150a is of type Active Directory (R), third party authentication server 150b is of type Domino, and third party authentication server 150c is of type Groupwise, as is understood in the art. As shown in FIG. 1, the third party authentication servers 150 are shown in direct communication with services 144 for ease of reference, however in many embodiments the authentication servers 150 may in fact communicate through network 124.

The wireless network gateway 110 is configured to send data packets received from the mobile device 201 over the WWAN 102 to the wireless connector system 120. The wireless connector system 120 then sends the data packets to the appropriate connection point such as the services 144. Conversely, the wireless connector system 120 sends data packets received, for example, from the services 144 to the wireless network gateway 110 which then transmits the data packets to the destination mobile device 201. The AP interfaces 116 of the WLAN 104 provide similar sending functions between the mobile device 201, the wireless connector system 120 and network connection point such as the services 144. In further example embodiments, a user may concurrently or alternatively access the services 144 through computer 117.

A difficulty with existing conventional third party authenticator systems is that there may be many different third party authenticators, each being able to support multiple credential types. For example, it may be redundant and unnecessarily complex to create a specific pluggable external authentication module ("plug-in") for each credential for each third party authenticator.

In many existing conventional systems having pluggable external authentication modules, the pluggable external authentication module merely sends or relays the provided credential information to the identified third party authentication server, without any consideration of the credential type or types which may be supported by the third party authentication server.

In example embodiments, there is provided pluggable external authentication modules, each of which may support one or more credential types of third party authentication servers 150. Referring briefly to FIG. 1, for example, Active Directory 150a can for example support credential types of "password" and "single sign-on", while Domino 150b and Groupwise 150c can for example support credential type of "password" only. Other possible supported credential types in accordance with example embodiments are smart card (e.g. SIM) and PIN. A user interface is provided on the client device 201 to display the available third party authenticators 150 and their respective credential types. Clients can receive selection of the appropriate authenticator and credential type and send the appropriate credentials to the authentication server 306. An application of the authentication server 306 can transparently delegate the authentication request to the responsible pluggable external authentication module. The pluggable external authentication module can then choose the appropriate authentication method to perform authentication on the client credentials based upon the selected credential type.

Figure 3:
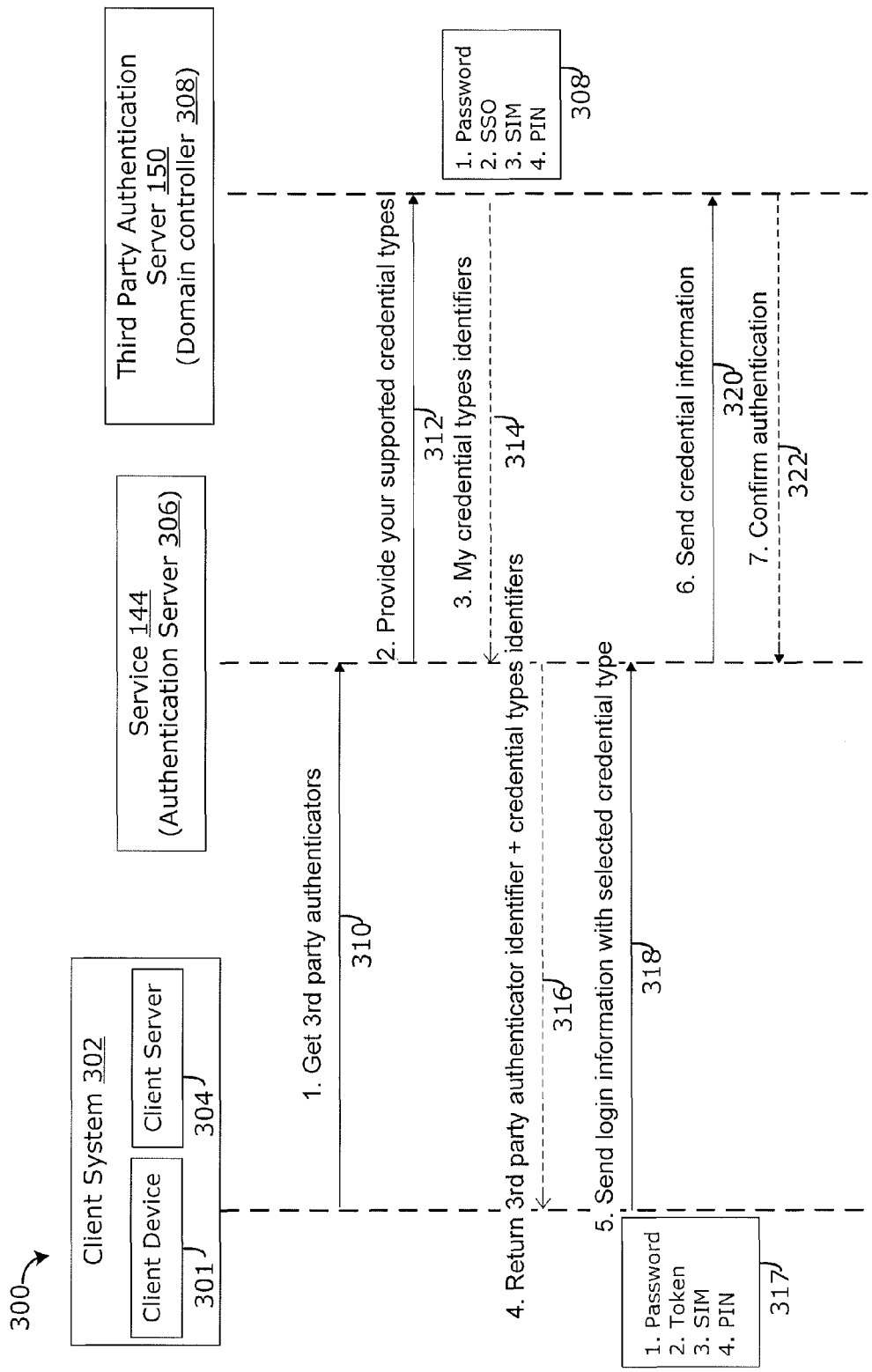
FIG. 3 shows a flow diagram of a detail communication between a client system, a service including an authentication server, and a third party authentication server in accordance with an example embodiment.

Reference is now made to FIG. 3, which shows a flow diagram 300 of a detail communication between a client system 302, a service 144 including an authentication server 306, and a third party authentication server 150 in accordance with an example embodiment. The authentication server 306 includes a controller and a memory containing modules for operation thereof. The third party authentication server 150 includes a domain controller 308, as is understood in the art, for controlling operation thereof. As shown, the client system 302 acts as a client and may include a client device 301 (e.g. mobile device 201 or suitable computer terminal) and/or a client server 304.

Referring again to FIG. 2, the applications 225 may include a security manager 272 for facilitating the authentication functions described herein. In some example embodiments, the security manager 272 merely acts as a platform which communicates with the client server 304, wherein the client server 304 provides most of the functionality for the login process. The client server 304 may for example include an API (application programming interface) client or web service, as is understood in the art. This may be implemented by the mobile device 201 within a typical web browser such as Internet Explorer, Mozilla Firefox, Safari, etc., as is understood in the art. This may be referred to as a thin client system. In other example embodiments, the security manager 272 of the client device 301 itself provides the bulk of the functionality such as session control, ticket exchanging, etc., as would be understood in the art. In such an embodiment, the client server 304 may merely act as a relay or may not be present at all. This may be referred to as a fat client system or thick client system.

Again referring to FIG. 3, the flow diagram 300 will now be described in greater detail. In example embodiments, the client system 302 and authentication server 306 are configured to send, receive, and/or process a "credential type" data object. This credential type may for example be a parameter, data transfer object, flag, data structure, or other type of data object. The credential type is the particular credential type supported by a particular third party authentication server 150. At process 310, the client system 302 requests the identification of the available third party authenticator servers and the identification of their respective supported credential types. At process 312, the authentication server 306 queries all third party authentication servers 150 for their supported credentials types (this may be performed via or entirely by a pluggable external authentication module). In this example, only one third party authenticator 150 is shown for illustration purposes. As illustrated by supported credential types 308, the third party authenticator 150 in this example may include but are not limited to password, Single Sign On (SSO), SIM and PIN. At process 314, these supported credential types are sent to the authentication server 306. At process 316, the authentication server 306 sends the supported credential types of each third party authenticator 150 to the client server 302.

At this stage, the client device 301 may display a user interface, which includes a list of at least one of the supported credential types 308 of the third party authentication server 150, and an option to select the at least one of the supported credential types 308. Upon receiving selection of the supported credential types 308, at process 318 the client system 302 sends login context information including the appropriate credential information 317 and the selected credential type, as well as appropriate authenticator identifiers, to the authentication server 306. As shown, the credential information 317 may include password, token (for SSO), SIM, or PIN. For example, referring to FIG. 2, SIM 231 may be accessed or retrieved from memory module 230, or PIN 291 may be accessed or retrieved from flash memory 244. The password may be obtained from the user interface. The token may be obtained from the third party authentication server 150, as described in greater detail below with respect to SSO. Referring to FIG. 3, at process 320, the authentication server 306 sends, via the appropriate pluggable external authentication module, the credential information (317) and appropriate login information to the identified third party authentication server 150. At process 322, the authentication server 306 receives a message indicating successful authentication (or failure otherwise).

Figure 9:
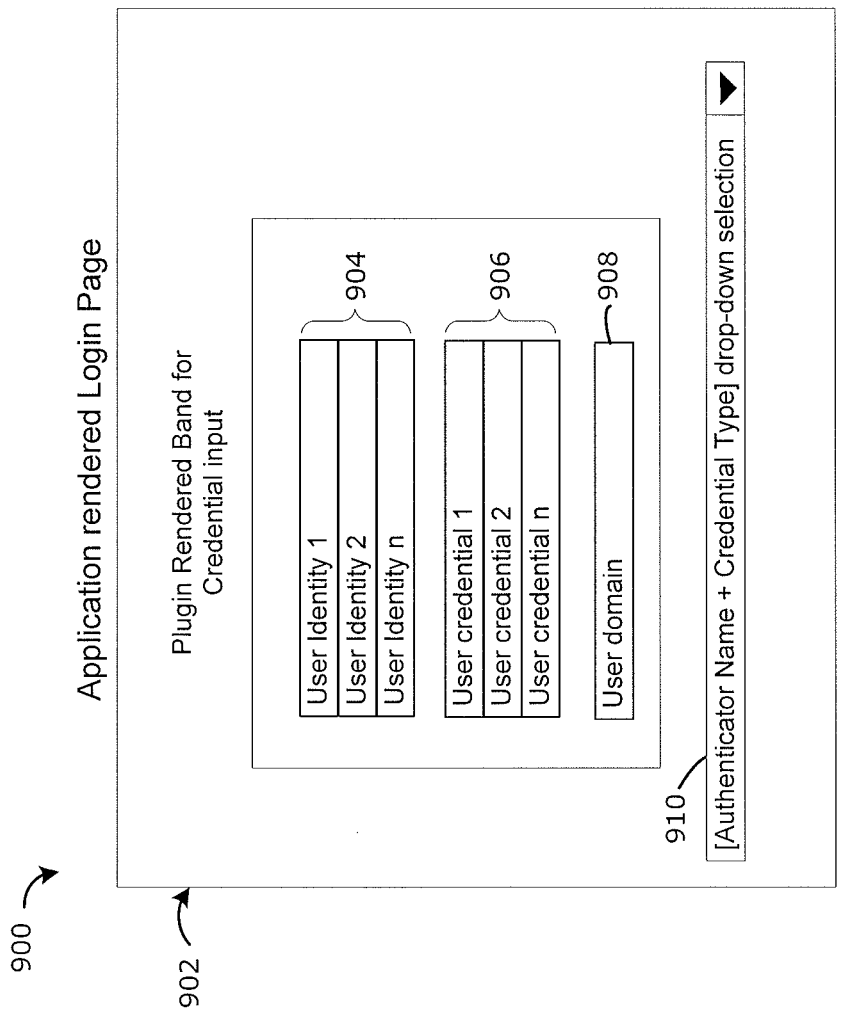
FIG. 9 shows an example user interface of a login page in accordance with an example embodiment.

Reference is now made to FIG. 9, which shows an example user interface 900 of a login page 902 in accordance with an example embodiment. This may for example be displayed on a display of the client device 301, and rendered by an appropriate application (rendered by either the client device 301 or the client server 304 depending on whether the system is a thick client system or thin client system). As shown, the login page 902 includes fields for user identity 1, 2, . . . , n (904), and fields for the user credentials 1, 2, . . . , n (906). There is also a field for a user domain 908 (which is optional and may be automatically populated in some embodiments). The login page 902 further includes a drop-down selection menu 910, which includes an option for selection of particular third party authentication servers by name as well as their supported credential type(s).

Figure 4:
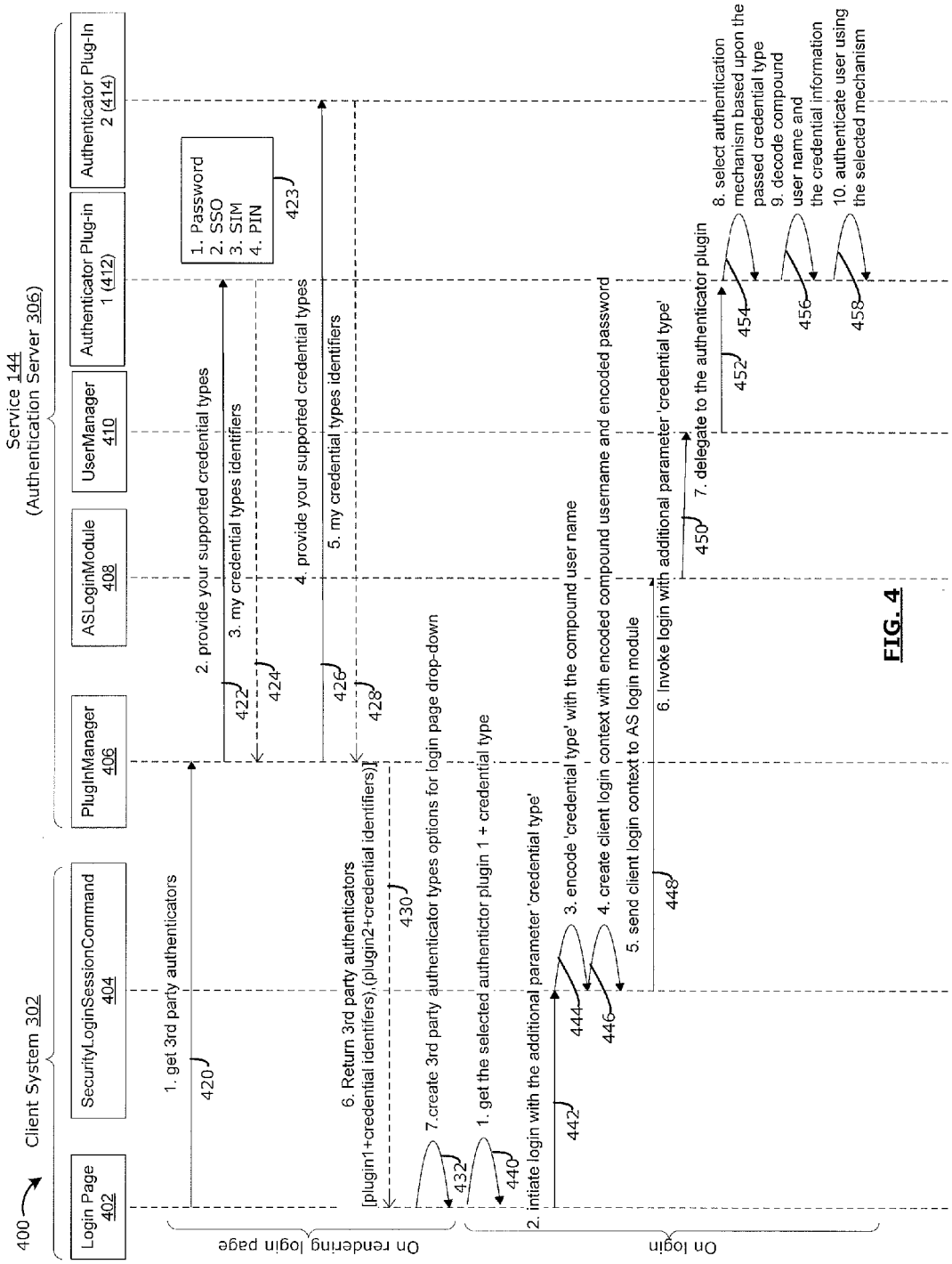
FIG. 4 shows a flow diagram of a detail communication system and process between a client system and a service including an authentication server, in accordance with another example embodiment.

Reference is now made to FIG. 4, which shows a flow diagram 400 of a detail communication system between a client system 302 and a service 144, the service 144 including an authentication server 306. Similar reference numbers are used for convenience. The authentication server 306 includes pluggable external authentication modules, denoted as Authenticator Plug-in 1 (412) and Plug-in 2 (414). Each Plug-in 412, 414 may correspond to a specific third party authentication server 150, for example Plug-in 1 (412) may correspond to Active Directory 150a (FIG. 1) and Plug-in 2 (414) may correspond to Domino 150b (FIG. 1). The authentication server 306 also includes the modules of plug-in manager module 406, Authentication Server login module 408, and user manager module 410. The client system 302 includes the modules of login page module 402 and security login session command module 404. Generally, as shown in FIG. 4, processes 420 to 432 relate to rendering of a login page via the login page module 402, while processes 440 to 458 relate to processes upon login. In example embodiments, the various modules are configured to send, receive, and/or process a "credential type" object, which facilitates third party authentication of the client system 302.

At 420, the login page 402 requests all available third party authenticators from the plug-in manager module 406. The plug-in manager 406 then requests each specific plug-in 412, 414 (two in this example) to provide their supported credential types, wherein there may be one or more credential types supported by each plug-in 412, 414. Accordingly, at 422 the plug-in manager module 406 then requests plug-in 1 (412) for its credential types, and at 424 in response plug-in 1 (412) sends the supported credential types. Similarly, at 426 the plug-in manager module 406 requests plug-in 2 (414) for its credential types, and at 428 in response plug-in 2 (414) sends the supported credential types to the plug-in manager module 406. As illustrated by supported credential types 423, plug-in 1 (412) may support password, SSO, SIM and/or PIN.

Figure 5:
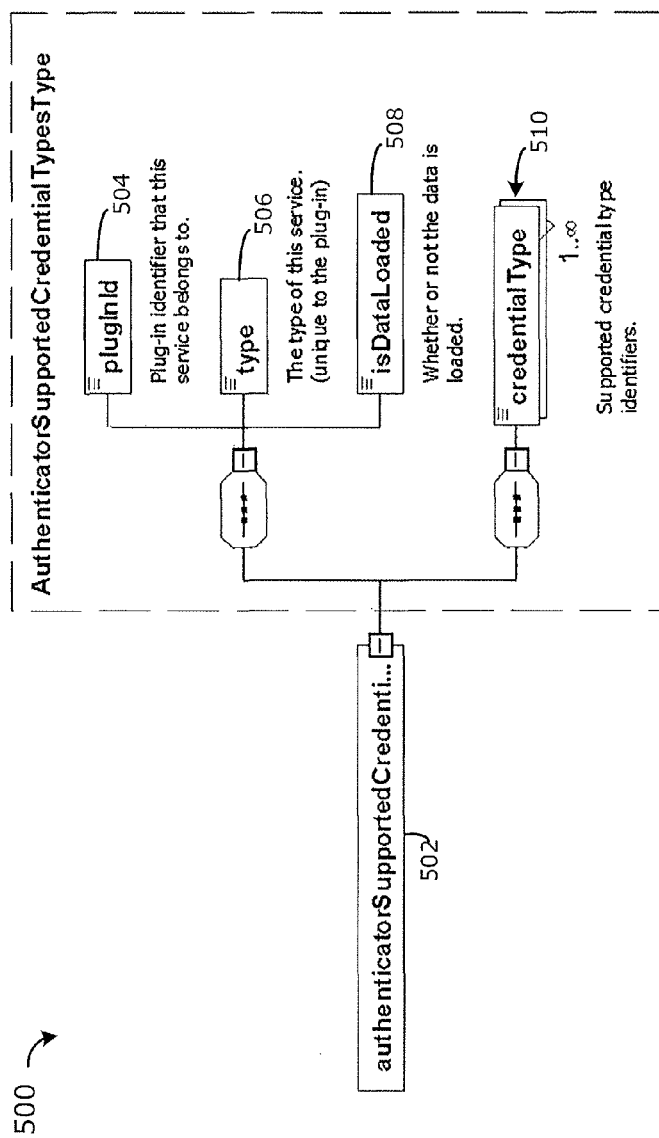
FIG. 5 shows a data object of authenticator supported credential types in accordance with an example embodiment to be used in the flow diagram of FIG. 4.

Reference is now briefly made to FIG. 5, which shows a data transfer object 500 of an authenticator supported credential types 502 in accordance with an example embodiment. The data transfer object 500 may be what is sent at process 424 and 428 (FIG. 4), wherein the data transfer object 500 includes a credential type 510, which is the supported credential type identifiers for each authenticator plug-in 412, 414 (FIG. 4). The authenticator supported credential types 502 also includes the plug-in ID 504, which is the identifier of the authenticator plug-in (e.g. 412 or 414) associated with its particular third party authentication server 150; the Type 506, which is the type of service (unique to the plug-in); and IsDataLoaded parameter 508, which is whether or not data is loaded.

Referring again to FIG. 4, at process 430 the plug-in manager 406 returns to the login page module 402 the identification of the plug-ins 412, 414 as well as their respective supported credential types. At 432, the login page module 402 creates third party authenticator types options for a login page drop-down. This may for example be displayed on a user interface in the form of a list or menu of selectable credential types for each third party authenticator. FIG. 9 shows an example of such a login page 902.

Referring still to FIG. 4, reference is now made to processes 440 to 458, which relate to processes upon login. At 440, the login page module 402 receives a command selecting one of the supported authenticator plug-ins (plug-in 1 (412) in this example) as well as the selected credential type, and other information such as domain and username. The particular credential information that is sent depends on the credential type. If the selected credential type is of type "password", the login page module 402 may also receive user password information (e.g. alphanumeric) from the user interface. If the credential type is of type "token", the token has been obtained from the third party authenticator 150. In other selected credential types (e.g., SIM or PIN), the relevant credential information may be retrieved or accessed from the appropriate memory.

At 442, the login page module 402 sends relevant login information along with the selected parameter "credential type". At 444, the Security Login Session Command module 404 encodes the user name and the credential information together (referred to herein as a "compound user name"), together with the selected credential type. At 446, the Security Login Session Command module 404 creates a client login context with the encoded compound username and encoded password, along with additional information as necessary. At 448 the Security Login Session Command module 404 sends the client login context to the login module 408.

Figure 6:
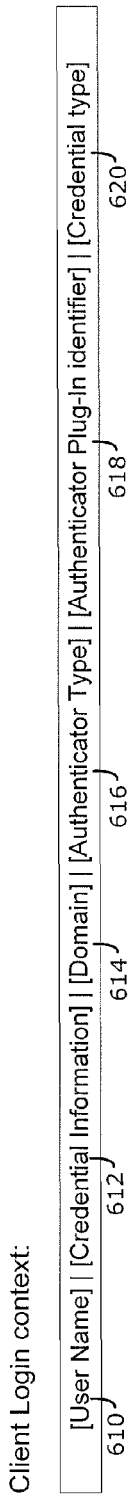
FIG. 6 shows a data object of login context information in accordance with an example embodiment to be used in the flow diagram of FIG. 4.

Reference is now briefly made to FIG. 6, which shows a data object 600 of the client login context in accordance with an example embodiment. The data object 600 may for example be generated at process 446 and sent at process 448. As shown, the data object 600 includes encoded parameters for User Name 610; Credential Information 612; Domain 614, which is the domain string of the client; Authenticator Type 616 (e.g. plug-in); Authenticator Plug-In identifier 618; and Credential type 620, which is the selected credential type.

Referring again to FIG. 4, continuing with the example, at 450 the login module 408 invokes login with additional parameter 'credential type' to the user manager module 410. At 452, the user manager module 410 delegates the username, password, domain, and the selected credential type to the identified plug-in (plug-in 1 (412) in this example).

At 454, plug-in 1(412) selects an appropriate authentication mechanism of the third party authentication server 150 based upon the passed selected credential type. At 456, plug-in 1(412) decodes compound user name and the credential information. At 458, plug-in 1(412) authenticates the user using the selected authentication mechanism from the third party authentication server 150.

Referring still to the system and flow diagram 400 shown in FIG. 4, an example embodiment implementing Single Sign-On (SSO) will now be described in greater detail. In example embodiments, an "SSO" option may be selected using the login page 902 (FIG. 9). In other example embodiments, for SSO the list or menu of credential types not required, and the flow diagram 400 starts at process 442. In other example embodiments, SSO as credential type may be pre-selected as a selectable option in a configuration menu or using a selectable option upon installation at the client.

In the following example embodiments, without intending to be limiting, the third party authentication server 150a is Active Directory and the credential type is SSO, and plug-in 1 (412) is the associated plug-in for Active Directory. The example authentication mechanism for SSO credential type in these embodiments is Kerberos, which is understood in the art to be a secure authentication protocol in which a trusted third party is relied upon to perform authentication of clients through exchange of encrypted tickets or tokens. For example, Kerberos is the native authentication protocol for Windows Active Directory domains. Generally, SSO enables the service 144 to authenticate clients which have obtained a Kerberos Ticket from the Active Directory domain server. This means client devices 301 may not have to provide their Active Directory username, password and domain information explicitly to the authentication server 306. The client system 302 can use the local Kerberos credential cache to obtain their Ticket Granting Ticket (TGT) and do Kerberos Exchange (TGS-Exchange) with the Domain Controller (KDC) 308 to obtain the service ticket and provide the obtained ticket to the authentication server 306. The authentication server 306 can validate this ticket using a Kerberos Key exchanged from the Domain Controller 308. Note that the authentication server 306 becomes Kerberos enabled service in order to obtain this Kerberos Key.

In example embodiments, some web based clients (browsers) such as Internet Explorer, Firefox and Safari can be configured to automatically obtain a service ticket using HTTP-Negotiate if the Web server hosting the URL supports Single Sign-on using Kerberos. This support is provided by these browsers using a mechanism referred to as Integrated Windows Authentication (IWA). In other example embodiments using thick client systems, the client obtains this service ticket explicitly using a Ticket Granting Ticket (TGT) stored in a local Kerberos credential cache. It can be appreciated that authenticating the web client users using Single Sign-on may allow a client user to merely open its IWA configured browser to by-pass the login screen.

Referring still to FIG. 4, SSO login flow is performed as follows. The client system 302 initiates a SPNEGO login by obtaining a SPNEGO token from the Active Directory authentication server 150a. At process 442, the login page module 402 of the client system 302 initiates login with the Base64 encoded SPNEGO token string, the credential type, the external authenticator identifier (Active Directory plug-in Id in this example) the username, domain and external authentication type. At process 444, the security login session command module 404 encodes the new credential type parameter as well with the compound user name (user name and password/credential information) and creates a client login context. At 446, the client system 302 sends the login context (including the credential type parameter) to the login module 408. The login flow from this point until authenticator plug-in 1 (412) (e.g. Active Directory plug-in) is performed in a similar manner as described above. At 450, the AS Login Module 408 gets the compound username and the password. At 452, the AS Login Module 408 delegates the username, password, domain, and credential type to the identified plug-in which is the Active Directory plug-in 412 (via User Manager module 410). At 454, the Active Directory plug-in 412 checks the credential type parameter and determines if the client user needs SPNEGO based authentication. At 456, if the credential type is SPNEGO, the Active Directory plug-in 412 decodes the password (which is a Base64 encoded SPNEGO token) and gets the client SPNEGO token. At 458, the Active Directory plug-in 412 creates a server side GSS context using the user's credentials. The Active Directory authentication server 150a (FIG. 1) accepts the GSS security context using the client SPNEGO token. If the context is established, client is authenticated successfully.

Still referring to FIG. 4, after successful authentication additional steps or processes may be performed. Generally, the AD plug-in 412 performs the remainder of the authentication process eventually resulting in an AS user Id (in relation to the authentication server 306). On successful authentication, AD plug-in 412 returns an AS User ID to the User Manager module 410 which creates a User Login Attributes object using the returned AS User ID. The User Manager module 410 returns the User Login Attributes object to the AS Login Module 408. The AS Login Module 410 then initializes the security session with the returned User Login Attributes. The AS Login Module 408 sets a Principal data object with the username as well as the credential in the security session. The AS Login Module 408 sets the compound user name (encoded user name) with password and the User Login Attributes. The AS Login Module 408 returns to the security login session command module 404 the Principal data object and the security session. The security login session command module 404 then returns the session to the client user (e.g. client device 301).

Figure 7:
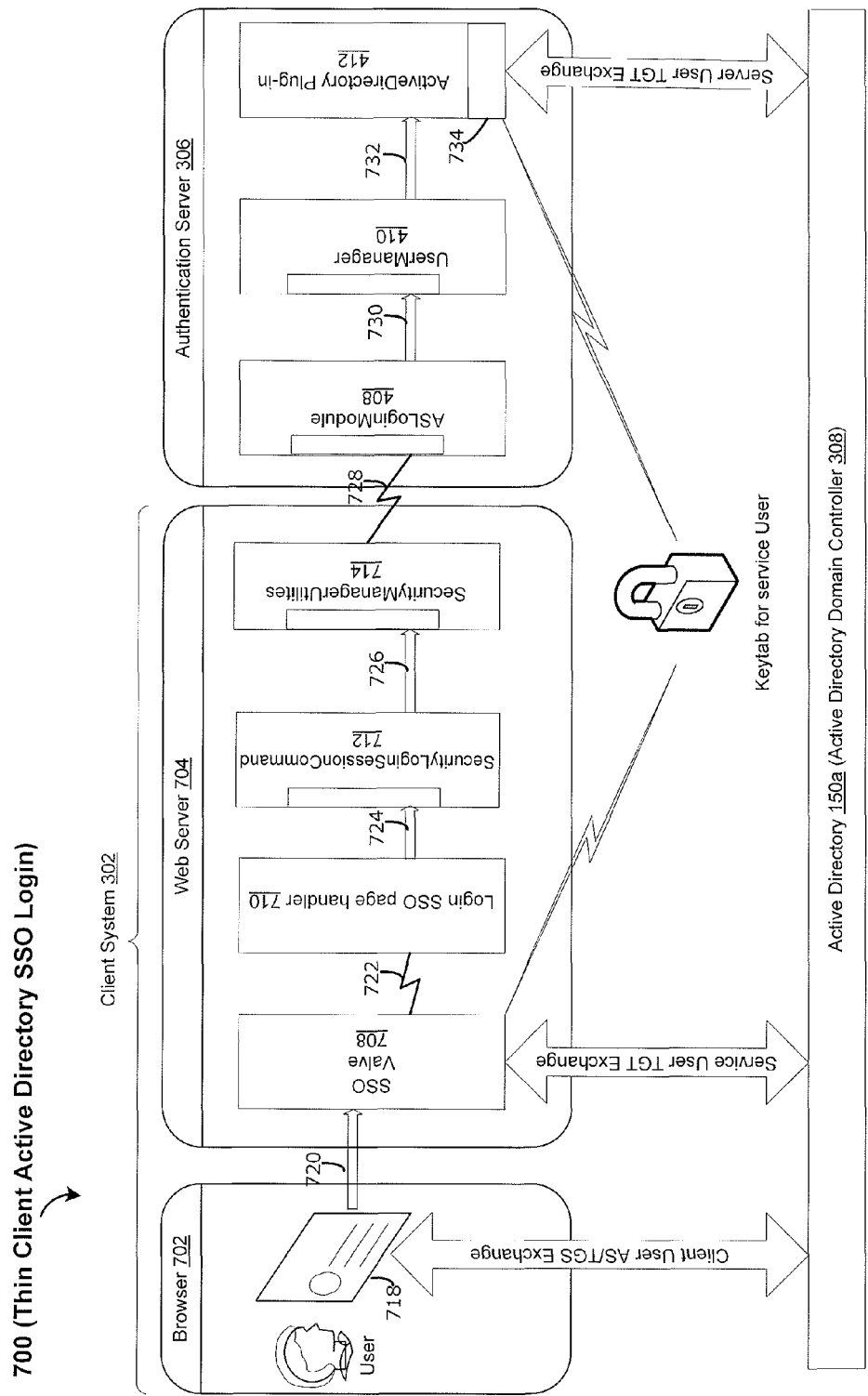
FIG. 7 shows a block diagram illustrating third party authentication of a thin client system and process using single sign on (SSO) login, in accordance with an example embodiment.
Figure 8:
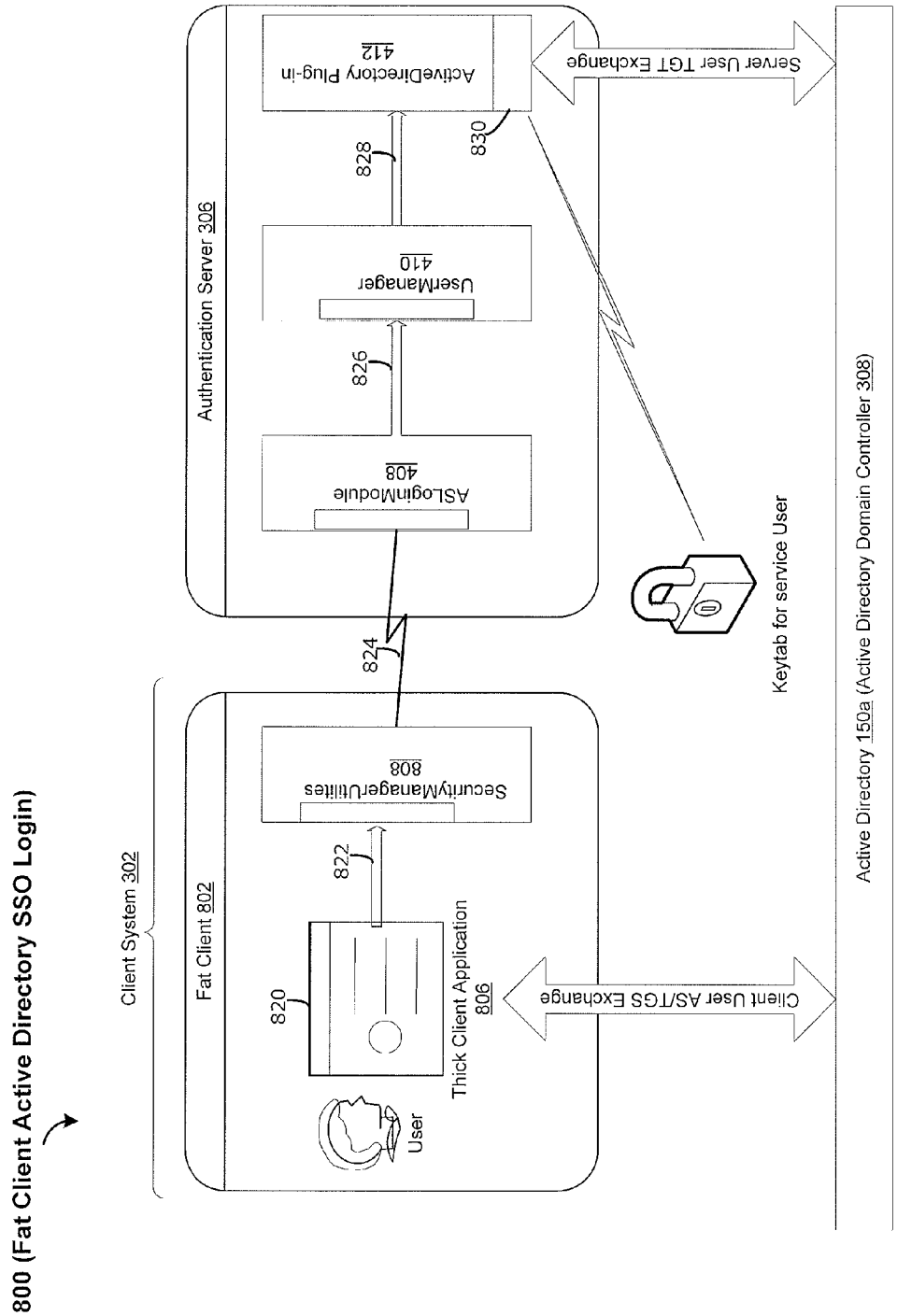
FIG. 8 shows a block diagram illustrating third party authentication of a thick client system and process using single sign on (SSO) login, in accordance with an example embodiment.

Reference is now made to FIGS. 7 and 8, which shows a block diagram illustrating a third party authentication of a client systems using single sign on (SSO) login, in accordance with example embodiments. Similar reference numbers are used for convenience. In the described example embodiments, without intending to be limiting, the third party authentication server 150a is Active Directory and the credential type is SSO, and the plug-in 1 (412) is the associated plug-in for Active Directory.

FIG. 7 shows a thin client system 700 and associated process in accordance with an example embodiment, which includes the client system 302, the authentication server 306, and the Active Directory authentication server 150a. The client system 302 includes a browser 702 and a web server 704. The web server 704 includes SSO valve 708, Login SSO page handler 710, security login session command module 712, and security manager utilities 714.

The SSO valve 708 may for example be implemented to get the credentials set from the browser which initiated the SSO URL request. The login SSO page handler 710 processes the SSO URL request. This page translates credentials set by the SSO Valve 708 the login process to start. On page load, the SSO page handler 710 uses HTTP parameters set by the SSO Valve 708 to create SSO credentials. These credentials are used to initiate SSO login from the page.

Specific steps of the thin client system 700 will now be described in greater detail, still referring to FIG. 7. At 718, the browser 702 includes an HTTP Client which attempts to access a desired or specified authentication server domain (or URL) to request an SSO page for the purpose to bypass explicitly providing user credentials for login to Service 144. If already authenticated by the authentication server 306, the browser 702 will be redirected to the service 144 home page. If not already authenticated, the SSO Valve 708 intercepts the HTTP request and initiates HTTP-Negotiate to get the credentials from the HTTP client, wherein the credentials are in the form a SPNEGO token At 720, the HTTP Client sends the SPNEGO token (containing forwardable TGT & TGS) to the SSO Valve 708 by initiating a GSS security context. The SSO Valve 708 accepts the SPNEGO token and creates a Subject including username, domain and client GSS credentials. At 722, the Login SSO page handler 710 accesses the username, domain and the delegated client GSS credentials provided by the SSO Valve 708. The Login SSO page handler 710 initiates GSS security context and gets an SPNEGO client token. Login SSO page handler 710 encodes the SPNEGO client token into a Base64 encoded string. At 724, the Login SSO page handler 710 provides the username, domain, encoded SPNEGO client token as password or credential information, authenticator Id (in this example Active Directory plug-in identifier) and the external authenticator type and the additional parameter 'credential type' to the Security Login session command module 712.

At 726, the Security Login session command module 712 forwards the login information along with the additional credential type parameter to the Security Manager Utilities module 714. At 728, the Security Manager Utilities module 714 encodes a compound user name (user name and password) with the additional credential type parameter, and provides same to AS Login Module 408. At 730, the AS Login Module 408 invokes login with additional parameter for credential type. At 732, the User Manager delegates to the Active Directory plug-in 412 with additional credential type parameter. At 734, the Active Directory plug-in 412 checks the credential type parameter. If it is type SSO, the Active Directory plug-in 412 treats password or credential information as a SPNEGO token and decodes the token for authentication using the active directory domain controller 308.

As can be appreciated, referring again to FIG. 7, for the thin client system 700, the credential type may be implicitly chosen by a web application of the web server 704 when there is no initial manual login attempt by the user for Single Sign-on (SSO). The web application of the web server 704 may implicitly reads the credentials of the user from the HTTP request and delegates those credentials for authentication with credential type as 'SSO'. Accordingly, much of the functionality in this embodiment may be performed by the web server 704, including the sending of the selected credential type.

FIG. 8 shows a thick client system 800 configured for implementing of a single sign on (SSO) login, in accordance with an example embodiment. Similar reference numbers are used for convenience. The system 800 includes the client system 302, the authentication server 306, and the Active Directory authentication server 150a. The client system 302 includes a fat client 802 which includes a thick client application 806 and a security manager utilities module 808. Accordingly, the fat client 802 provides much of the functionality in this example. The fat client 802 may for example be a desktop application.

Upon installation or using a configuration menu, an interface may be provided on the fat client 802 which includes an option to select SSO as the credential type. For example, check-box based options may be added which provides the option to enable Active Directory (Third party authentication server) SSO (credential type) authentication. If Active Directory SSO authentication is enabled, the fat client 802 may automatically implement SSO, which includes sending to the authentication server 306 the identification of SSO credential type in the credential type parameter.

Still referring to FIG. 8, the process implemented by the fat client system 800 will now be described in greater detail. At 820, the thick client application 806 obtains a SPNEGO token from the client user's Kerberos credentials, from the Active Directory authentication server 150*a*. At 822, the thick client application 806 initiates login with the Security Manager Utilities Module 808 using the client user name and the valid SPNEGO token as password or credential information. For example, the token can be base64 encoded and placed into the password string. An additional parameter for credential type is also passed which indicates SSO as the credential type. At 824, the Security Manager Utilities Module 808 encodes a compound user name with the additional credential type parameter, and sends the same together with the password string to the AS Login Module 408. At 826, the AS Login Module 408 invokes login with additional parameter for credential type. At 828, the User Manager 410 delegates to the Active Directory plug-in 412 with additional credential type parameter. At 830, the Active Directory plug-in 412 checks the credential type parameter. If it is type SSO, the Active Directory plug-in 412 treats password or credential information as a SPNEGO token and decodes the token for authentication using the active directory domain controller 308.

As can be appreciated, in some example embodiments only the client system 306 and the external authenticator plug-in module 412 or 414 may need to be modified or configured to effect operation of the above-describe embodiments. Thus, in example embodiments the third party authentication servers 150 operate as normal and are unaware of any such modifications. For thin client systems, the client device or client user may also be unaware of any such modifications, as much of the functionality is performed by the client server 304.

It may be appreciated that the use of the credential type parameter may assist the plug-in in choosing the appropriate authentication mechanism based upon the selected credential type. For example, should the third party authentication server 150 support more than one authentication protocol (and therefore more than one credential type), the associated authenticator plug-in would direct the credential information appropriately to the third party authentication server 150 for using the correct authentication protocol.

While the operations of the methods and flow diagrams have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be removed or combined in other embodiments, and some of the steps described above may be separated into a number of sub-steps in other embodiments. Even further, some or all of the steps may be repeated, as necessary.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

While some of the present embodiments are described in terms of methods, a person of ordinary skill in the art will understand that present embodiments are also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology. Therefore, the described embodiments are considered to be illustrative and not restrictive.

What is claimed is:

1. A method of authenticating a client using a third party authentication server, the method being performed by an intermediate server configured to communicate with the client and the third party authentication server, the method comprising:

requesting, by a plug-in executing on the intermediate server and associated with a third party authentication server, a list of supported credential types of said third party authentication server, wherein the list of supported credential types is selected from the group comprising: a password, a single sign-on (SSO) authentication token, a PIN, and a smart card credential;

receiving, from the plug-in, said list of supported credential types of the third party authentication server;

sending, to the client, an identification of the supported credential types of the third party authentication server in the list;

receiving, from the client, credential information and a selected credential type from the list of supported credential types;

sending the credential information and the selected credential type to the plug-in;

determining, by the plug-in, if the selected credential type is supported by the third party authentication server, and transmitting the credential information received from the client to the third party authentication server for authenticating the client, in response to determining the selected credential type is supported by the third party authentication server;

wherein the plug-in is selected from a plurality of plug-ins, and each of the plurality of plug-ins is associated with a different third party authentication server.

2. The method of claim 1, wherein the intermediate server is associated with a service, and wherein a successful authentication permits access to applications provided by the service.

3. The method of claim 1, further comprising receiving, from the client, an identification of the third party authentication server.

4. The method of claim 1, wherein the supported credential types comprise a ticket-based authentication credential.

5. The method of claim 1, wherein the credential information comprises a token, and wherein the third party authentication server supports a token-based authentication protocol.

6. The method of claim 1, wherein the credential information and the selected credential type are received as encoded information.

7. The method of claim 6, further comprising decoding the encoded information to generate the credential information and the selected credential type.

8. A non-transitory computer-readable medium storing instructions for authenticating a client using a third party authentication server, the instructions for execution by an intermediate server configured to communicate with the client and the third party authentication server, wherein when the instructions are executed, the instructions configure a processor of the intermediate server to:

request, by a plug-in executing on the intermediate server and associated with the third party authentication server, a list of supported credential types of said third party authentication server, wherein the list of supported credential types is selected from the group comprising: a password, a single sign-on (SSO) authentication token, a PIN, and a smart card credential;

receive, from the plug-in, said list of supported credential types of the third party authentication server;

send, to a client, an identification of the supported credential types of the third party authentication server in the list;

receive, from the client, credential information and a selected credential type from the list of supported credential types;

send the credential information and the selected credential type to the plug-in;

determine, by the plug-in, if the selected credential type is supported by the third party authentication server, and transmit the credential information received from the client to the third party authentication server for authenticating the client, in response to determining the selected credential type is supported by the third party authentication server;

wherein the plug-in is selected from a plurality of plug-ins, and each of the plurality of plug-ins is associated with a different third party authentication server.

9. An intermediate server configured to communicate with a client and a third party authentication server to allow the client to be authenticated using the third party authentication server, the intermediate server comprising:

a hardware processor configured to provide a plug-in associated with the third party authentication server;

wherein the hardware processor is further configured to:

request, by the plug-in, a list of supported credential types of said third party authentication server wherein the list of supported credential types is selected from the group comprising: a password, a single sign-on (SSO) authentication token, a PIN, and a smart card credential;

receive, from the plug-in, said list of supported credential types of the third party authentication server;

send, to a client, an identification of the supported credential types of the third party authentication server in the list;

receive, from the client, credential information and a selected credential type from the list of supported credential types;

send the credential information and the selected credential type to the plug-in;

determine, by the plug-in, if the selected credential type is supported by the third party authentication server, and transmit the credential information received from the client to the third party authentication server for authenticating the client, in response to determining the selected credential type is supported by the third party authentication server;

wherein the plug-in is selected from a plurality of plug-ins, and each of the plurality of plug-ins is associated with a different third party authentication server.

10. The intermediate server of claim 9, wherein the intermediate server is associated with a service, and wherein a successful authentication permits access to applications provided by the service.

11. The intermediate server of claim 9, wherein the hardware processor is further configured to receive, from the client, an identification of the third party authentication server.

12. The intermediate server of claim 9, wherein the supported credential types comprise a ticket-based authentication credential.

13. The intermediate server of claim 9, wherein the credential information comprises a token, and wherein the third party authentication server supports a token-based authentication protocol.

14. The intermediate server of claim 9, wherein the credential information and the selected credential type are received as encoded information.

15. The intermediate server of claim 14, wherein the hardware processor is further configured to decode the encoded information to generate the credential information and the selected credential type.

* * * * *